United States Patent
González Vogel et al.

(10) Patent No.: US 12,384,708 B2
(45) Date of Patent: Aug. 12, 2025

(54) METHOD FOR RECOVERING WATER AND CHEMICALS FROM PLANTS FOR TREATING EFFLUENTS FROM PULP AND PAPER FACTORIES

(71) Applicant: INVESTIGACIONES FORESTALES BIOFOREST S.A., Concepción (CL)

(72) Inventors: Álvaro Mauricio González Vogel, VIII Región (CL); Rafael Ignacio Quezada Reyes, VIII Región (CL)

(73) Assignee: INVESTIGACIONES FORESTALES BIOFOREST S.A., Concepción (CL)

( * ) Notice: Subject to any disclaimer, the term of this patent is extended or adjusted under 35 U.S.C. 154(b) by 947 days.

(21) Appl. No.: 17/609,265

(22) PCT Filed: May 9, 2019

(86) PCT No.: PCT/CL2019/050037
§ 371 (c)(1),
(2) Date: Nov. 5, 2021

(87) PCT Pub. No.: WO2020/223829
PCT Pub. Date: Nov. 12, 2020

(65) Prior Publication Data
US 2022/0204377 A1    Jun. 30, 2022

(51) Int. Cl.
*C02F 9/00*    (2023.01)
*B01D 61/42*    (2006.01)
(Continued)

(52) U.S. Cl.
CPC .............. *C02F 9/00* (2013.01); *B01D 61/423* (2022.08); *B01D 61/445* (2013.01); *C01D 3/14* (2013.01);
(Continued)

(58) Field of Classification Search
None
See application file for complete search history.

(56) References Cited

U.S. PATENT DOCUMENTS

| 5,567,293 A | 10/1996 | Paleologou et al. |
| 9,637,802 B2 | 5/2017 | Medoff et al. |

(Continued)

FOREIGN PATENT DOCUMENTS

| CN | 108623054 A | 10/2018 |
| CN | 108623104 A | 10/2018 |

(Continued)

OTHER PUBLICATIONS

"Machine Translation of CN108623105", Xing et al., CN108623105A, published 2018, 53 total pages.), (Year: 2018).*

(Continued)

*Primary Examiner* — Jonathan M Peo
(74) *Attorney, Agent, or Firm* — Morrison & Foerster LLP

(57) ABSTRACT

Described herein is a process for upgrading effluent treatment plants for pulp and paper production processes, where salts are removed from the effluent for water reuse and chemical recovery. The process comprises a first dialysis system for salt removal, a second treatment system for recovery or re-concentration, and optionally a post-treatment of the re-concentrate preventing liquid discharges to the environment. In the first system, a reversible electrodialysis or reversible pulsed step is carried out, separating the salts from the effluent, which are sent to the second treatment system to concentrate the salts (re-concentrate) or transform them into useful chemicals for the same process (recovery). Chemical recovery is achieved by electrodialysis with bipolar membranes or metathesis, to reduce the re-concentrate stream, which cannot be reused in the same (Continued)

plant. Lastly, this stream may be treated by spray drying, crystallization or evaporation.

13 Claims, 1 Drawing Sheet

(51) Int. Cl.
    *B01D 61/44*     (2006.01)
    *C01D 3/14*     (2006.01)
    *C01D 5/16*     (2006.01)
    *C02F 1/00*     (2023.01)
    *C02F 1/463*     (2023.01)
    *C02F 1/469*     (2023.01)
    *C02F 1/66*     (2023.01)
    *C02F 101/30*     (2006.01)
    *C02F 103/28*     (2006.01)
    *D21C 11/00*     (2006.01)
    *D21C 11/10*     (2006.01)

(52) U.S. Cl.
    CPC ............ *C01D 5/16* (2013.01); *D21C 11/0014* (2013.01); *D21C 11/0035* (2013.01); *D21C 11/0042* (2013.01); *D21C 11/10* (2013.01); *B01D 2311/2523* (2022.08); *B01D 2311/2649* (2013.01); *B01D 2311/2684* (2013.01); *C02F 1/004* (2013.01); *C02F 1/463* (2013.01); *C02F 1/4693* (2013.01); *C02F 1/66* (2013.01); *C02F 2101/30* (2013.01); *C02F 2103/28* (2013.01); *C02F 2301/046* (2013.01)

(56) References Cited

U.S. PATENT DOCUMENTS

| | | | |
|---|---|---|---|
| 2006/0060532 A1* | 3/2006 | Davis | B01D 61/025 204/522 |
| 2009/0101583 A1* | 4/2009 | Perry | B01D 61/58 210/664 |
| 2009/0127194 A1* | 5/2009 | Joo | C02F 1/4672 210/638 |
| 2014/0151296 A1* | 6/2014 | Moore | C02F 1/283 210/683 |

FOREIGN PATENT DOCUMENTS

| | | |
|---|---|---|
| CN | 108623105 A | 10/2018 |
| EP | 0601614 A1 | 6/1994 |
| WO | 2019/014781 A1 | 1/2019 |

OTHER PUBLICATIONS

Abass et al. (Dec. 2015). "Optimization of complex integrated water and membrane network systems," The Journal of Southern African Institute of Mining and Metallurgy 115(12): 1143-1158.

Chen et al. (Sep. 1, 1998). "The Treatment of a High Strength Pulp and Paper Mill Effluent for Wastewater Reuse. IV) A Pilot Study into the Production of High Quality Recycle Water using Tertiary and Deep Treatment," Environmental Technology 19(9): 861-871.

International Search Report and Written Opinion mailed Feb. 7, 2020, directed to International Application No. PCT/CL2019/050037; 22 pages.

Kahmark et al. (1999). "Pulp and Paper Effluent Management," Water Environment Research 71(5): 836-852.

Kamali et al. (Apr. 2015). "Review on recent developments on pulp and paper mill wastewater treatment," Ecotoxicology and Environmental Safety 114: 326-342.

Nataraj et al. (Oct. 2007). "Membrane-based microfiltration/electrodialysis hybrid process for the treatment of paper industry wastewater," Separation and Purification Technology 57(1): 185-192.

Pfromm et al. (Dec. 1999). "Electrodialysis for Bleach Effluent Recycling in Kraft Pulp Production: Simultaneous Control of Chloride and Other Non-Process Elements," The Canadian Journal of Chemical Engineering 77: 1231-1238.

Pfromm. (Feb. 1997). "Low Effluent Processing in the Pulp and Paper Industry: Electrodialysis for Continuous Selective Chloride Removal," Separation Science and Technology 32(18): 18 pages.

* cited by examiner

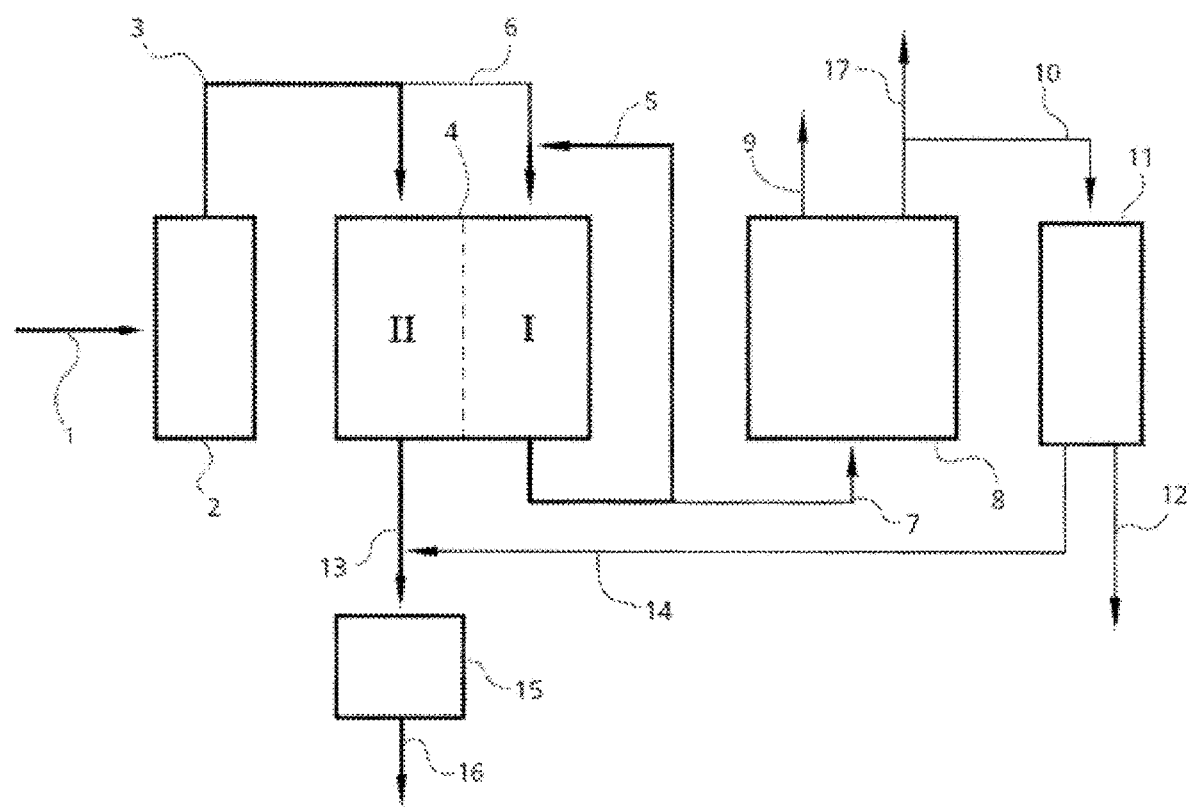

METHOD FOR RECOVERING WATER AND CHEMICALS FROM PLANTS FOR TREATING EFFLUENTS FROM PULP AND PAPER FACTORIES

CROSS-REFERENCE TO RELATED APPLICATIONS

This application is a U.S. national stage application under 35 U.S.C. § 371 of International Application No. PCT/CL2019/050037, filed May 9, 2019, and published Nov. 12, 2020, as WO2020/223829, the entire contents of which is incorporated herein by reference.

FIELD OF THE DISCLOSURE

This disclosure relates to the treatment of industrial effluents, and in particular, effluents coming from pulp and paper mills, wherein chemicals are recovered from said effluents, and the reuse or recirculation of the already treated water.

BACKGROUND OF THE DISCLOSURE

Currently, water recovery in pulp and paper mills from their effluent treatment plants is limited by the high content of organic matter and salts present in the effluent. If recirculated, the organic matter contained in the effluent would modify the characteristics of the final product and increase the consumption of bleaching chemicals, while salts would accumulate as non-processable elements in the system, leading to scaling and corrosion in the equipment.

The treatment and recirculation of water from effluent treatment plants has been previously suggested in the prior art.

U.S. Pat. No. 5,567,293 A, discloses the use of electromembrane (EM) processes for the treatment of ash from the electrostatic precipitator of the recovery boiler. More specifically, the process consists of the use of electrodialysis with bipolar membranes for the transformation of the diluted ash, or the selective separation of salts using electrodialysis with monovalent membranes. This document does not contemplate the treatment of a stream coming from an effluent treatment plant of pulp and paper production processes, that has a high organic matter load, nor does it mention the mixture of different technologies such as electrocoagulation or coagulation together with flotation, electrodialysis reversal (EDR), conventional electrodialysis (ED) or bipolar electrodialysis (BPED) or metathesis (EDM), spray drying, and consequently, it does not mention that effluent treatment plants may be upgraded to not emit liquid discharges.

Similarly, the publication by P. Pfromm, Tsai and Henry ("Electrodialysis for Bleach Effluent Recycling in Kraft Pulp Production: Simultaneous Control of Chloride and other Non-Process Elements"; The Canadian Journal of Chemical Engineering; Vol. 77; 1999) indicates the use of electrodialysis with monovalent membranes for the selective removal of chloride from a sectorial stream from the acid bleach filtrate for recirculation to the liquor circuit in a Kraft plant. Therefore, this publication does not cover upgrading effluent treatment plants for pulp and paper production processes, nor the combination of technologies such as electrocoagulation or coagulation together with flotation, electrodialysis reversal (EDR), and bipolar membrane electrodialysis (BPED) or metathesis (EDM) for chemical recovery. Nor does it mention the term "zero liquid discharge", since, by treating sectoral streams, a general effluent treatment still exists.

On the other hand, U.S. Pat. No. 9,637,802 B2 contemplates upgrading the process streams, alluding to upgrading lines for maximum recovery of by-products from biomass processing plants, including pulp and paper plants. This recovery of by-products is related to the biorefinery concept, where by-product vapors are obtained from biomass, and not on the closure of water circuits and "zero liquid discharge". Neither is there any mention of upgrading conventional effluent treatment plants, although it is quite generic in its description of the updating of streams. The process described includes steps of ionic radiation, saccharification of biomass, electrodialysis with bipolar membranes for production of organic salts, and conventional or reversible electrodialysis for separation of salts from streams, with clear emphasis on the separation of by-products rather than on water purification for recirculation or reuse in the same process. It may be interpreted that the emphasis of that document corresponds to a biorefinery and not to effluent treatment plant upgrades for "zero liquid discharge", not to mention the use of spray dryers or crystallizers to avoid effluent discharge at the end of the process.

Finally, Chen and Horan's publication ("The Treatment of a High Strength Pulp and Paper Mill Environmental Technology; Vol. 19; 1998) studies the reuse of effluent from a pulp and paper mill using EDR. This publication is the closest prior art to this disclosure. However, the publication only mentions the use of chemical coagulation with aluminum oxide as a pretreatment for the removal of organic matter and makes no reference to a second step of dialysis to re-concentrate the reject, or to the recovery of useful chemicals using bipolar membrane electrodialysis (BPED) or metathesis (EDM). There is also no mention of the use of spray drying or crystallization to avoid effluent discharge. Thus, this document corresponds to an incomplete form of this disclosure, focusing only on water recovery and not on the recovery of subsequent chemicals in a second treatment step, nor on zero liquid discharge.

Therefore, a process is required to upgrade a pulp and paper mill effluent treatment plant to achieve minimal or no liquid discharge, using a strategy to completely recirculate the effluent with different technologies working together to achieve these objectives, recovering water and chemicals that are useful for the process or for other industries. Thus, in this disclosure the expression "zero liquid discharge" is to be understood as the complete closure of the water circuit, without the disposal of effluents in water bodies.

In this disclosure the term "upgrade" and the like, is to be understood as the addition of new units to the effluent treatment plant, to expand the functions it is able to perform. In this case it is the treatment of effluent for reuse as raw water, both in the pulp and paper production process and in irrigation or other related activities, and recovery of chemicals, useful for the same plant or other industries.

SUMMARY OF THE DISCLOSURE

Full water recovery from pulp and paper mill effluent may be achieved through the appropriate selection of water treatment technologies that work together.

Usually, in pulp and paper industry effluent treatment plants, mechanical treatments are used for the separation of particulate matter, pH adjustment, and biological treatment for the coarse removal of organic compounds. A fraction of these organic compounds is recalcitrant, impossible to remove by biological methods, but does not represent a complication in complying with environmental regulations when the effluent is discharged into the ocean. The opposite occurs in some countries, when the effluent is discharged into rivers or other bodies of water, where the amount of organic matter and color of the effluent have greater restrictions. In addition, the availability of fresh water in some cases may limit the production of factories. Thus, circuit closure could be an attractive alternative to deal with environmental problems and water availability for production.

The remaining recalcitrant organic matter, after conventional effluent treatment by mechanical and biological processes (primary and secondary treatment), is removed by tertiary treatment, which generally consists of chemical coagulation systems using coagulants and flocculants followed by flotation and filtration. Thus, most of the organics present, and the color, are removed, complying with environmental standards for discharge into freshwater bodies. However, the recovery of this water and its recirculation into the production process requires additional systems that separate the inorganic salts to achieve the recirculation of the desalinated water, avoiding the generation of incrustations, corrosion and/or accumulation of non-processable items.

Thus, the following disclosure proposes the use of pulsed electrodialysis reversal (pEDR) (WO2019014781) or electrodialysis reversal (EDR) as the core process, preferably pEDR, for the separation of inorganic salts from the effluent previously treated by conventional primary, secondary and tertiary treatments, allowing its reuse in the pulp and paper mill. Hereinafter EDR is used to refer to both conventional reversible electrodialysis and pulsed reversible electrodialysis. Secondary pretreatment considers the passage of effluent through existing biological treatment systems such as aerated lagoons, activated sludge, anaerobic treatment, etc., followed by tertiary treatment, preferably by an electrocoagulation step, or chemical coagulation, photooxidation, electrooxidation, chemical oxidation, flotation and/or filtration, centrifugation, or cyclone separation. The removal of organic matter and fouling elements such as calcium, magnesium, iron, or aluminum is also necessary to continue with the next step of EDR. If the values of these ions exceed the input values required by EDR, pretreatments or adjustments in the conventional treatment must be used to lower the critical concentration values of these fouling elements.

Post-dialysis with EDR is followed by post-treatments for the reuse of the separated salts and the reduction in volume of the rejection stream obtained by re-concentrating the salts that cannot be recovered. This re-concentrated reject stream is preferably sent to crystallizers/evaporators, or to spray dryers or mechanical evaporators to completely treat the remaining effluent, reducing as much as possible the reject flow or completely avoiding its discharge into bodies of water.

BRIEF DESCRIPTION OF THE FIGURES

FIG. 1: is a schematic representation of the process of upgrading an effluent treatment plant to achieve "zero liquid discharge" in pulp and paper mills.

DETAILED DESCRIPTION OF THE DISCLOSURE

The disclosure relates to a process of water recovery from pulp and paper mill effluent treatment plants, comprising the following steps:

a) pass the previously physically and biologically treated effluent in the effluent treatment plant, to a tertiary treatment system to be selected from: electrocoagulation, chemical coagulation, photooxidation, electrooxidation, chemical oxidation, flotation and/or filtration, centrifugation, or cyclone separation, for coarse removal of remaining organic matter, obtaining an effluent with low organic matter content (1) (less than 100 ppm), measured as chemical oxygen demand.

b) pass the effluent (1) obtained in step (a) through a filtration system (2), for safety, to generate an effluent free of the remaining suspended solids (3) from the tertiary treatment.

c) pass part of the effluent free of suspended solids (3) obtained in step (b) through a first dialysis system (EDR, 4), which is selected from a pulsed electrodialysis reversal or a electrodialysis reversal for separation of a concentrate (7) and recovery of the water as a dialyzed effluent (13).

d) pass the concentrate (7) obtained in step (c) through a second treatment system (8), using conventional electrodialysis (ED), bipolar electrodialysis (BPED) or metathesis (EDM), for the recovery of chemicals (9, 17) and/or re-concentration of salts, as a re-concentrated reject stream (10), with a content of salts not useful for the pulp and paper production process.

e) optionally pass the re-concentrated rejection stream (10) obtained in step (d), through a drying system (11), obtaining a condensate (14) and a solid by-product (12) to be reused in the same pulp and paper manufacturing process or in another application requiring it, preventing liquid discharges into the environment.

f) optionally pass the dialyzed effluent (13) obtained in step c, and the condensate (14) obtained in step (e) through a cooling tower (15), if the pulp and paper production process require it, to control the temperature of the water feeding the industrial plant.

FIG. 1 shows the treatment of an effluent (1), which has been previously treated by conventional tertiary treatments for the removal of sediments and organic matter, such that the quality of the effluent stream (1) matches the input requirements to a first dialysis system (4), with respect to fouling elements, pH, temperature, and organic matter, where these pretreatments are selected from one or more pretreatment systems: electrocoagulation, chemical coagulation, photooxidation, electrooxidation, chemical oxidation, in addition to flotation and/or filtration, centrifugation or cyclone separation. EDR, electrodialysis reversal, is preferred as the first dialysis system (4) because of its robustness and efficiency compared to conventional ED or other membrane methods. Whereby, the system of the disclosure may be coupled to effluent treatment plants already in operation. Other recovery methods, such as "Mechanical Vapor Compression (MVC)", may be preferred when there is no installed effluent treatment infrastructure, such as activated sludge or conventional effluent treatment plants.

The first dialysis system, EDR (4) may require a pretreatment with a filtration system (2) to be selected from: self-cleaning disc filters, cartridge filters or multimedia filters, preventing the passage of suspended solids remaining from tertiary effluent treatment. Preferably, pretreatments that do not increase the load of inorganics are used because it increases the number of steps required in the first dialysis system, EDR (4), to reach the desired dialysis level, and consequently, the size and cost of operation of the EDR plant (4) and the subsequent recovery or drying processes (8, 11).

Part of the filtered effluent (free of remaining suspended solids) (3) enters the first treatment or dialysis system, EDR (4), specifically in the diluate zone (compartment II), where the ions are removed. These ions, mainly inorganic salts, move towards the concentrate zone (compartment I), to be returned through a recirculated concentrate stream (5), towards the same cell, maximizing recovery. Thus, a small stream of concentrate (7) passes to a second treatment system (8) of the process. At this point it is necessary to reincorporate part of the effluent free of remaining suspended solids (3) through a dilution stream (6), to avoid supersaturation and salt encrustation in compartment I, where said dilution stream (6), is mixed with the recirculated concentrate stream (5), before entering compartment I.

The second treatment system (8) allows maximum recovery of the remaining effluent and/or the recovery of chemicals, depending on the process selected. This process may consist of conventional electrodialysis (ED), bipolar membrane electrodialysis (BPED), or electrodialysis with metathesis (EDM). A stream of liquid by-product(s) (9, 17) and a re-concentrated reject stream (10) are obtained from this second treatment system (8), with salts that are not useful in the pulp and paper production process. The liquid by-product(s) obtained (9, 17) also depend(s) on the selected process (8). In the case of using conventional ED, the liquid by-product obtained (9) will be dialyzed water, which may be re-mixed with the effluent free of suspended solids (3) for reprocessing. When using BPED, the liquid by-product obtained will consist of a soda stream (9) and acid (17) from the dissociation of salts from the concentrate stream (7), which may be returned to the effluent treatment process or pulp and paper production as chemical inputs. If EDM is used, the liquid by-product obtained (9) will be sodium sulfate, which may be returned to the pulp and paper production process as a chemical input. The reconcentrated reject stream (10), for each of the cases, may optionally be sent to a drying step by means of a drying system (11) which is selected from: crystallizers, evaporators, spray dryers, to avoid the disposal of liquid waste in water bodies. The condensate (14) may be mixed with the dialyzed effluent (13), which comes from compartment II, to be sent to cooling towers (15) if it is necessary to lower the effluent temperature before recirculation. On the other hand, a solid by-product (12) is obtained from the drying system (11). This solid by-product (12) is a soluble salt whose composition depends on the process used in the second treatment system (8) (ED, BPED or EDM). For conventional ED and BPED, the composition of the solid by-product (12) will consist of the salts present in the treated effluent, concentrated to the maximum using this second treatment system (8). The use of BPED will lead to a reduction in the size of the drying step through the drying system (11) selected, since part of the salts will be transformed into chemical inputs returned to the production process in the liquid by-product obtained (9, 17), reducing the number of salts to be dried in the drying system (11). On the other hand, if the technology used is EDM, the re-concentrated reject stream (10) will consist mainly of chloride salts, since part of the inorganic content (sodium sulfate) of the liquid by-product obtained (9) is returned to the pulp and paper production process, while the solid by-product (12) will consist of chloride salts concentrated to the maximum. By recovering utility salts from the effluent with EDM, the amount to be dried in the drying system is reduced (11). Thus, the use of BPED and EDM represents a more sustainable way of treating the concentrate stream (7). Finally, the dialyzed and cooled effluent (16) may be sent to the raw water treatment plant to re-enter the pulp and paper production process, and the solid by-product (12), reused in the same pulp and paper manufacturing or in another industry or application as appropriate. This eliminates the discharge of liquids out of the system.

EXAMPLES

With the embodiments of this disclosure, it is possible to recover at least 85% of the final effluent of a Kraft process. In all examples it is assumed that the effluent has already passed through a tertiary treatment of chemical coagulation or electrocoagulation, flotation and filtration or centrifugation, and meets the input requirements of a first dialysis system, EDR (4). It is also assumed that it passed through an effective filtration system (2) that removes suspended solids (3) that may be left over from tertiary treatment, prior to the first dialysis system, EDR (4).

In the first dialysis system with EDR (4), 85 to 95% of the water from the effluent may be recovered, depending on the characteristics of the effluent, the main limitation being the types of elements contained in the effluent and the input pH. Wastewater rich in calcium, magnesium, aluminum, iron, and manganese, for example, will limit recovery, since these salts may precipitate and encrust the system in the concentrate compartment I or in the second treatment system (8). For the examples described in the following paragraphs, an effluent is used that has a calcium and magnesium concentration of less than 50 ppm, and an Al, Fe and Mn concentration of less than 0.1 ppm each, never exceeding 1 ppm during unstable operation. Thus, a recovery of 90% is estimated in the first dialysis system, EDR (4). The pH is also critical, mainly because in an alkaline medium organic matter is present in colloidal form, so a slightly acidic pH is preferred, with a range of 5 to a maximum of 8.

The dialysis level in EDR (4) determines the quality of the water obtained to be reused in the same pulp and paper mill. The conductivity of the dialyzed water is usually around 50 to 400 μS/cm, depending on the input conductivity of the filtered effluent and the number of steps in the first dialysis system, EDR (4). Thus, if an effluent with a conductivity of about 2,000 μS/cm enters a first dialysis system, EDR (4) of 3 steps, the water obtained would have a conductivity of about 180 μS/cm, considering a reduction of 55% of conductivity for each step, this decreases in conductivity per step may change according to the types of membrane and spacers used by the EDR supplier. Quality requirements will be defined by each plant.

In the second treatment system (8) there are major differences; here there are several alternatives that will be described in separate examples according to the treatment of the concentrate coming from the first EDR dialysis system (4).

Example 1

The treatment of the concentrate stream (7) coming from the first dialysis system, EDR (4) contemplates the production of soda (9) and a mixture of acids (17) (mainly sulfuric and hydrochloric acid) using bipolar membrane electrodialysis (BPED) in the second treatment system (8). This variant is especially attractive when an electrocoagulation process is used in tertiary treatment as a step prior to the filtration system (2). In electrocoagulation, a pH adjustment of the effluent pH is required to obtain, after this treatment, a slightly acidic pH stream before entering the first dialysis system, EDR (4), so the acid stream (17) generated in BPED is especially useful to adjust the pH in the same effluent treatment, prior to tertiary treatment with electrocoagulation. On the other hand, the soda (9) as a liquid by-product obtained with BPED, may be sent to the pulp and paper production process.

In this case, no subsequent evaporation is required if the entire stream is sent to pH adjustment, since the major impurities remain in the acid compartment of the BPED cell and are directed to pH adjustment through the acid stream (17), which is returned to the electrocoagulation process, where the salts are precipitated avoiding their accumulation in the circuit. This acid stream (17) will contain part of the salts coming from the concentrate stream (7); the content of these salts will depend on the recovery obtained in BPED in the second treatment system (8). The maximum possible recovery is preferred, to avoid sending salts back to the effluent. If there is an overproduction of acid (17) for pH adjustments in the effluent, this acid may be used for other purposes in the pulp and paper mill. Otherwise, it may be reduced to solids using the drying system (11).

Example 2

Treatment of the concentrate stream (7) coming from the first dialysis system, EDR (4) may be carried out with the use of electrodialysis with metathesis (EDM) in the second treatment system (8), where the sulfate salts (mainly $Na_2SO_4$) may be selectively separated from the chloride salts. This re-concentrate of chloride salts (10) is highly soluble (with solubilities on the order of 300,000 ppm). Therefore, the stream containing these reconcentrated salts (10) is a small flow (<1% of the total effluent). The sulfate salts in the liquid by-product stream obtained (9) from the second treatment system (8) may be returned to the pulp and paper production process, while the small flow with chloride salts in the re-concentrated salt stream (10) may be sent to the drying system (11) using evaporation, spray drying or crystallization, to avoid its discharge as effluent, if necessary.

Example 3

The concentrate stream (7) coming from the first dialysis system, EDR (4) may be re-concentrated with conventional ED in the second treatment system (8) using acid and antiscalants to prevent scale formation. This way is the simplest way to obtain a re-concentrated salt stream (10) suitable for a drying step in a drying system (11) by evaporation, spray drying or crystallization. However, the methods in examples 1 and 2 are preferred, as they are considered more sustainable. The other liquid by-product stream obtained (9) corresponds to a demineralized effluent, which may be sent upstream, in combination with the effluent stream free of suspended solids (3), to be reprocessed.

ADVANTAGES OF THE EMBODIMENTS OF THE DISCLOSURE

By applying the process described herein, the following comparative advantages may be achieved with what has currently been developed in the prior art:
recovery of water for use during periods of drought.
prevention of effluent discharges into bodies of water, achieving "zero liquid discharge" in production processes.
compliance with restrictive environmental standards in terms of discharges into water bodies.
recovery of chemicals useful for effluent treatment or pulp and paper mills.
reduction of water consumption per ton of product produced.
reduction of the water footprint (amount of water used per amount of product produced).

The invention claimed is:

1. A process for the recovery of water from an effluent treatment plant for a Kraft process, free of organic matter and salts for subsequent recirculation, preventing discharge of liquids into an environment, the process comprising:
   a) passing previously physically and biologically treated effluent in the effluent treatment plant to a tertiary treatment system for coarse removal of remaining organic matter, wherein the tertiary treatment system is selected from the group consisting of: electrocoagulation, chemical coagulation, photooxidation, electrooxidation, chemical oxidation, flotation, filtration, centrifugation, and cyclone separation, to obtain an effluent with organic matter content of less than 100 ppm,
   b) passing the effluent obtained in step (a) through a filtration system to generate an effluent free of remaining suspended solids from the tertiary treatment system,
   c) passing part of the effluent free of remaining suspended solids obtained in step (b) through a first dialysis system, which is a pulsed electrodialysis reversal (pEDR) system, to form a concentrate and a dialyzed effluent,
   d) passing the concentrate obtained in step (c) through a second treatment system, which corresponds to an electrodialysis step, for the recovery of chemicals and re-concentration of salts as a reject re-concentrate stream with a content of salts not useful for a pulp and paper production process, and
   e) passing the reject re-concentrate stream obtained in step (d) to a drying system to form a condensate and a solid by-product, which is a soluble salt, to be reused in another application and to prevent the discharge of liquids in the environment.

2. The process of claim 1, wherein, in step (d), the second treatment system is selected from the group consisting of: conventional electrodialysis (ED), bipolar electrodialysis (BPED), and electrodialysis with metathesis (EDM).

3. The process of claim 1, wherein treatment prior to step (a) is carried out to remove particulate matter, adjust the pH, and remove part of the organic matter from the effluent to be treated.

4. The process of claim 1, wherein the filtration system used in the step (b) is selected from the group consisting of: self-cleaning disc filters, cartridge filters, and multimedia filters.

5. The process of claim 1, wherein in step (c), the part of the effluent free of remaining suspended solids that passes through the first dialysis system enters a dilution zone of the first dialysis system for the removal of ions, which move to a concentrate zone of the first dialysis system.

6. The process of claim 5, wherein a stream that is divided into the concentrate obtained in step (c) and a recirculation stream from the concentrate zone is obtained from the first dialysis system, wherein the recirculation stream is recirculated to the concentrate zone of the first dialysis system and is mixed with a dilution stream that comprises an other part of the effluent free of remaining suspended solids to avoid oversaturation and encrustation of the salts in the concentrate zone.

7. The process of claim 5, where the dialyzed effluent of step (c) is obtained from the dilution zone of the first dialysis system, wherein the dialyzed effluent of step (c) is passed through cooling towers to obtain a dialyzed and cooled effluent stream that is configured to be recirculated to a pulp and paper production process after passing through a raw water treatment plant.

8. The process of claim 1, wherein the drying system is selected from the group consisting of evaporators, spray dryers, and crystallizers.

9. The process of claim 7, where the condensate obtained from the drying system is mixed with the dialyzed effluent of step (c) coming from the dilution zone of the first dialysis system before entering the cooling towers.

10. The process of claim 1, where a liquid by-product stream and the reject re-concentrate stream obtained from the second treatment system and the solid by-product obtained after step (e) in the drying system depend on the second treatment system used.

11. The process of claim 10, wherein, when the second treatment system comprises conventional electrodialysis, the liquid by-product stream comprises a second dialyzed effluent remixed with the effluent free of remaining suspended solids obtained in step (b) for reprocessing, and the solid by-product comprises the salts from the concentrate obtained in step (c).

12. The process of claim 10, wherein, when the second treatment system comprises bipolar membrane electrodialysis, the liquid by-product stream comprises soda and acid returned to the Kraft process as a chemical input and the solid by-product comprises the salts from the concentrate obtained in step (c), and when the tertiary treatment system of step (a) is electrocoagulation, the acid of the liquid by-product stream is used as a pH adjuster.

13. The process of claim 10, wherein when the second treatment system comprises electrodialysis with metathesis, the liquid by-product stream comprises sodium, the reject concentrate stream comprises chloride salts, and the solid by-product comprises chloride salts.

* * * * *